United States Patent Office 2,708,167
Patented May 10, 1955

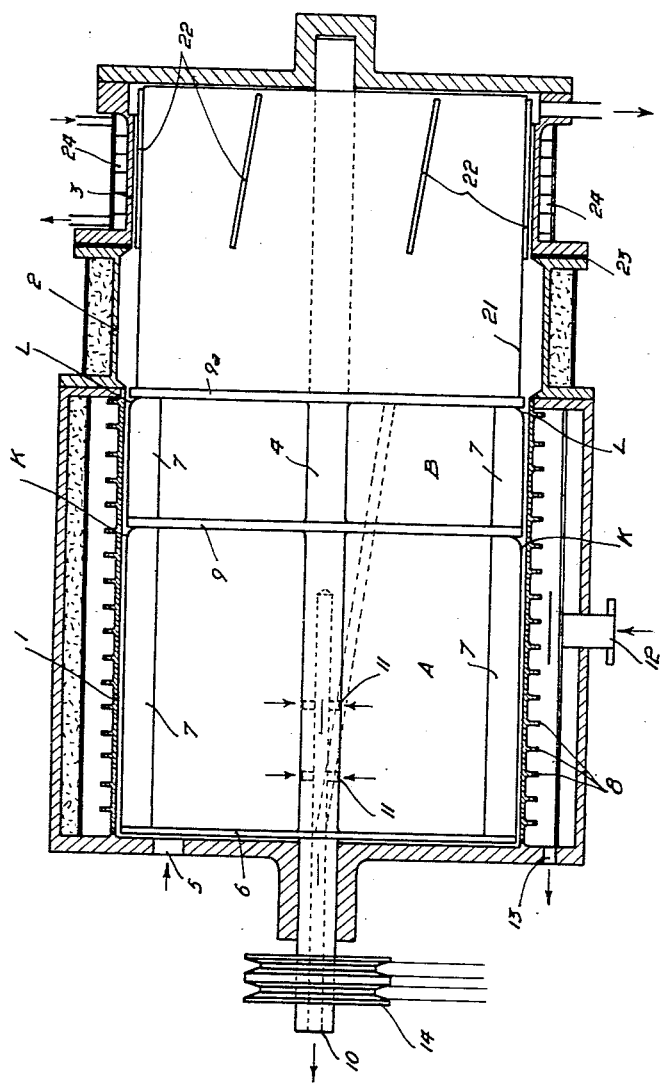

2,708,167

PASTEURIZATION OF HEAT SENSITIVE LIQUIDS

Ernst Nanz, Stuttgart, Germany, assignor to Societe pour l'Equipement des Industries Laitieres et Agricoles (S. E. I. L. A.), Paris, France, a corporation of France, and Walter Joseph Sidler, Zollikon, near Zurich, Switzerland Application August 19, 1952, Serial No. 305,232

Claims priority, application France October 19, 1951

8 Claims. (Cl. 99—211)

The object of the present invention is a method for the pasteurization of heat sensitive liquids in which all the properties of the liquids remain unaltered and in which an excellent sterilization is provided.

For pasteurizing heat sensitive liquids, particularly milk, cream and physiological liquids for instance, heating installations are used, based on various principles all of which, however, are based on the principle of a heat exchange through a metal wall.

Such principles use installations essentially comprising: a tubular heater, or a plate heater or a drum heater.

While, in the tubular heater or in the plate heater, the liquid to be treated flows through the channels formed by the tubes or plates, in the drum heater, the circulation of this liquid is obtained by a special drum, rotating inside a closed cylinder. The cylinder or in some cases the drum, are heated by means of steam or of hot water.

These three types of installations have been used as embodiments of the three known types of pasteurization:

Heating up to a high temperature, up to 85° C., without maintaining the temperature.

A short heating, up to 72° C. for forty seconds, and maintaining the acquired temperature.

A long heating, up to 63° C. for 30 minutes and maintaining the acquired temperature.

While the process of high temperature heating provides an approximately sufficient pasteurization, together with a destruction of germs, it does not enable to avoid, for instance in the case of milk, the risk of a loss of certain qualities, and this to such an extent that it is extremely difficult and, in some cases, impossible to ensure total destruction of harmful germs. Milk which has been heated up to 85° C. does not offer all the qualities of raw milk (alteration of enzymes, partial precipitation of proteides, destruction of the possibility of skimming etc.).

The short-heating up to 72° C. and the fact of keeping such liquids at the acquired temperature for 40 seconds, certainly results in killing the germs. It also maintains the possibility of skimming milk which has thus been treated. It requires, however, an extremely careful handling of the apparatus and of the maintenance of the temperature and of the rate of the outflow at constant levels. If, due to a variation in the rate of the outflow, the duration required for maintaining the temperature is not observed, the germ-destroying effect is no longer obtained if the duration is too small and the qualities of raw milk are destroyed in case the duration is too long.

When a treatment at 63° C. for 30 minutes is undergone, tolerances on the duration of treatment increase and the temperature is more easily controlled; on the other hand, the use of a continuous method becomes impossible, notwithstanding the fact that installations of this type require much more floor space and are very costly.

These three heating methods thus offer serious drawbacks, due to their principles, and also due to the proper arrangement of the heat exchangers.

In all these types of apparatus, indeed, the liquid particles which are directly in contact with the heating surface are heated above the desired temperature; in addition, they are subjected to much too long a hot treatment, due to the various outflow speeds of the various milk particles, the limit layer being slowed down due to its contact with the wall. This circumstance is detrimental to the value of the treated product and it is impossible to avoid the above-described loss of quality.

In addition to these drawbacks, it should also be mentioned as a special disadvantage that, in the case of milk or cream, these products can carbonize and adhere to the heating surface. This phenomenon is due to the presence of air which evolves from the liquids to be treated, when being heated.

The present invention, such as it is described hereunder, has for its object to avoid these various drawbacks. Another object is also to provide an apparatus meeting the new requirements of the method which is employed.

The pasteurization method, which is the subject matter of the invention consists in causing a thin layer of the liquid to be treated to flow through a short path, in a short time, at most equal to two seconds, in a double heating zone comprising a small heating area, in such a manner that all liquid particles be respectively subjected to heating during a period substantially approaching uniformity, the first heating zone, forming a gas-tight compartment, being maintained below the atmospheric pressure, then in sending the liquid, heated up to the required temperature in an annular heat-maintenance space where it is kept at that temperature for a few seconds, after which it is rapidly cooled down to a temperature at which it is non-sensitive.

The equal heating time thus obtained for the various particles makes it possible to preserve its homogeneity and value to the pasteurized liquid. The following explanations will help a better understanding of the manner in which this equality is obtained.

It may be assumed that the heating time depends upon the time during which the liquid remains in the heating zone of the apparatus. This duration itself depends on the length and section of the space through which the liquid must flow; it must be very short. To this effect, the new apparatus according to the invention comprises a short cylinder and a very small space between the driving elements and the wall of the cylinder.

In addition, to obtain the necessary effect of temperature rise for the liquid, a sufficient heating surface is necessary, which determines the dimensions of the heating zone.

However, in order to obtain a restricted heating area, it is thus necessary to realize as high as possible a heat transfer per area unit. This is obtained both through:

A high outflow speed of the liquid to be treated and by a high turbulence resulting from the small space between the driving elements and the wall of the cylinder and from the high rotation speed of the driving elements.

An increase in the heating area on the steam or hot water side circulation.

The conditions which are favourable for heat transfer, resulting from the outflow speed and the high turbulence of the liquid, as well as from the increase in the steam heating area, make it possible to obtain a rapid temperature rise of the liquid to be heated by using only a very small heating area.

The uniformity of the effective heating time of the various particles in the liquid depends on the time during which this liquid remains in the heating zone of the apparatus. The shorter this time is, the smaller the difference between the heating times of the particles which undergo the action of heat for too short and too long a period. The above stated dimensional and dynamical conditions thus concur in providing this uniformity.

In addition, the periods during which slow or fast particles (which are only in a small proportion) remain in the apparatus, differ very little from an average period of sojourn, which is itself very small, or at least varies within non detrimental time limits.

The above defined method may be worked by means of an apparatus especially designed for that purpose.

The apparatus designed for that purpose comprises, for example, a threefold coaxial device, each portion of which has a distinct function. The first device, located at the liquid inlet constitutes the cylindrical heating body the inner area of the wall of which has small dimensions, while the opposite surface of said wall, being in contact with the heating fluid is provided with embossed elements which substantially increase the area which is contacted by the heating fluid. Driving elements and driving rods capable of rotating at very high speeds while leaving a very small space for a thin layer of liquid between them and the inner surface of said heating body, are arranged inside this first device between discs which are mounted on a central rotating shaft. The heating body defines two heating zones, the first one of which comprises means which make it possible to maintain it below atmospheric pressure. The second device constitutes the heat-maintenance cylindrical body defining an annular zone in which the heated liquid is to stay for a few seconds. The section of said annular zone is in relationship with the exact period of time during which the pasteurized liquid should stay therein. The third device constitutes the cylindrical cooling body wherein the liquid is suddenly brought to a temperature at which it will no longer undergo any alteration. A rotary drum, mounted on the same shaft as the above cited discs occupies the inside of the heat-maintenance and cooling bodies. The drum is provided, on the portion which affects the cooling zone defined by the cooling body, with driving rods preferably obliquely arranged. The space provided between it and the wall of the cooling body is generally greater than the space in the heating double zone. The dimensions of this space depend upon the period of time during which the liquid circulating therein is to be allowed to stay.

The subdivision of the heating double zone for the liquid into two distinct compartments is effectively obtained by creating, along the limiting line of these two compartments, a gas tight ring constituted by the liquid to be pasteurized, itself. Said liquid sealing ring is obtained by notching the outer edges of the driving elements adjacent the points where they are connected to the disc located at the outlet end of the first heating compartment. The driving elements are preferably obliquely oriented to cause the advance of the liquid and, as already mentioned, the space separating them from the heating surface is very small, (about 0.5 mm.). An identical liquid sealing ring may be obtained, in the same manner, between the second heating zone and the heat-maintenance ring.

The lower pressure provided in the first heating compartment not only eliminates air from that compartment, but it also removes the gases from the liquid under treatment. This also makes it possible to prevent the liquid which might carbonize from adhering to the wall of the heating chamber. Working in a vacuum is particularly important for the pasteurization of cream.

Inlet and outlet orifices are provided for the various fluids, the heating fluid, the cooling fluid and in particular the fluid to be treated. The fluid to be treated circulates in annular channels. On the steam side, the wall of the heating body comprises ribs arranged so as to at least double the effective area.

By way of example, a type of embodiment of an apparatus according to the invention will be described hereinafter which meets the above listed conditions, with reference to the appended drawing.

The essential portions of this apparatus are, in coaxial arrangement, a cylindrical heating body 1, a body 2 for maintaining the warm body or heat-maintenance body, and a cooling body 3. Inside the apparatus and at the center thereof, a driving shaft 4 is arranged, mounted at its two ends on sealed bearings. Shaft 4 carries driving pulleys 14.

The liquid to be treated enters cylinder 1 through a duct opening into orifice 5, wherefrom it is seized by disc 6, then driven at high speed (over 12 m./sec.) by driving elements 7 which are fast with discs 6, 9 and 9a of shaft 4 rotating at the required speed. The liquid thus passes in a thin layer (about 0.5 mm.) along the wall of the heating body 1. After a very short time, it reaches heat-maintenance body 2 in which it occupies the annular zone comprised between wall 2 and cylinder 21. The thickness of this heat-maintenance zone is greater than the thickness of either the heating zone or the coating zone.

As stated above, the thinness of the liquid layer and the high peripheral speed of the driving elements 7 make it possible to avoid an overheating of some particles or an advance or a delay of some of them with respect to the average. The heating of the liquid is effected by means of steam which is introduced around the cylinder 1 through orifice 12. Orifice 13 is used for draining the steam condensation water. The heating area on the steam side is about twice as large as on the side of the liquid to be treated; this is obtained by the addition, to cylinder 1, of fins 8, moulded or welded on the outer surface. This arrangement, added to the thinness of the liquid layer and to the high turbulence makes it possible to use a relatively very small heating area.

The portion of the apparatus serving as a heating zone for the liquid to be treated is divided into two zones by disc 9. Driving elements 7 are, at the places designated by K and L, formed so as to create in each of said places, in the hollow space of the cylinder, a liquid ring insulating compartments A and B. The air from compartment A is exhausted by means of an air pump or, otherwise, through an axial channel 10 cut into the driving shaft 4; radial holes 11 connect the inside of compartment A with channel 10. In the second compartment B of the heater, the liquid is warmed up to the desired temperature. The air from this compartment should not be exhausted, since the liquid would then evaporate.

The portion of shaft 4, which is located beyond compartment B is provided with a drum 21. The diameter of the heat maintenance ring 2, constituted by a recess in the wall of the warm body 2, is chosen in such a manner that the widening of the liquid layer should correspond to the desired sojourn period of time, before the liquid is again seized by the driving rods 22 of drum 21 and led along the wall of cooling body 3. The contact between the walls of these bodies is avoided by the interposition of a washer 23 of thermal insulating material.

Cooling body 3 may also be constituted in such a manner that, instead of using water or another refrigerating liquid, the heat exchange may be obtained by causing the liquid to be treated to circulate through helical passages 24, before entering cylinder 1 through orifice 5.

What I claim is:

1. Apparatus for pasteurizing heat sensitive liquids, comprising in axial alignment a cylindrical heating chamber, a cylindrical heat maintenance chamber and a cylindrical cooling chamber, said heating chamber having an inlet for liquid to be pasteurized and said cooling chamber having an outlet for pasteurized liquid, a drive shaft extending axially through said chambers, means for rotating said shaft at high speed, three discs connected to and extending perpendicular to said drive shaft, a first one of said discs being located adjacent to the inlet end for liquid of said heating chamber, a second one of said discs being located adjacent the outlet end for liquid of said heating chamber, the third one of said discs being located between the other two discs, driving elements extending between said discs and spaced from the wall of said heating chamber a small distance to form a film of liquid between them and the wall of said heating chamber when they are rotated, at least one of said driving elements extending obliquely to cause advance of the liquid through said heating chamber, means for dividing said heating chamber into two gas tight compartments by forming a sealing ring constituted of some of the liquid being pasteurized, means for maintaining the compartment which is adjacent to the liquid inlet of said heating chamber at a pressure lower than atmospheric pressure, a drum connected to said drive shaft and spaced from the walls of said heat maintenance chamber and said cooling chamber, and means on said drum for advancing the liquid through said cooling chamber.

2. Apparatus according to claim 1, wherein the driving elements, adjacent the points where they are connected to the third one of said discs, are cut away at their outer edges to form a sealing ring constituted of some of the liquid being pasteurized.

3. Apparatus according to claim 2, further characterized by the fact that the driving elements, adjacent the points where they are connected to the second one of said discs, are cut away at their outer edges to form a second sealing ring constituted of some of the liquid being pasteurized.

4. Apparatus according to claim 1, wherein the section of the drive shaft in the compartment which is adjacent to the liquid inlet of said heating chamber is hollow and is in communication with said compartment and with a source of reduced pressure located outside of said compartment.

5. Apparatus according to claim 1, wherein the drum which is connected to the drive shaft is spaced a greater distance from the wall of the heat maintenance chamber than it is from the wall of the cooling chamber.

6. A process for pasteurizing heat sensitive liquids, which comprises flowing a thin layer of the liquid in the form of an annulus through a heating zone in contact with a heated wall for a period not exceeding two seconds to heat the liquid to pasteurizing temperature, dividing the heating zone into a first and second gas tight compartment by means including a sealing ring constituted by some of the liquid being pasteurized, the first compartment being located upstream relative to the second compartment, maintaining the first compartment at a pressure lower than atmospheric pressure, then passing the liquid into and holding an annulus of the liquid in a heat maintenance zone for a few seconds, and thereafter rapidly cooling an annulus of the liquid in a cooling zone to a temperature at which it is non-sensitive.

7. A process according to claim 6, wherein the annulus of liquid held in the heat maintenance zone is thicker than the annulus of liquid in the heating zone.

8. A process according to claim 6, wherein the annulus of liquid held in the heat maintenance zone is thicker than the annulus of liquid in the heating zone and is thicker than the annulus of liquid in the cooling zone.

References Cited in the file of this patent

UNITED STATES PATENTS

| | | |
|---|---|---|
| 913,600 | Willmann | Feb. 23, 1909 |
| 1,225,348 | Merrel | May 8, 1917 |
| 1,504,197 | Davis | Aug. 5, 1924 |

FOREIGN PATENTS

| | | |
|---|---|---|
| 357,064 | Great Britain | Sept. 17, 1931 |
| 377,714 | Great Britain | July 25, 1932 |